US012623326B1

(12) United States Patent
Chuang

(10) Patent No.: US 12,623,326 B1
(45) Date of Patent: May 12, 2026

(54) NAIL GUN WITH AN AUXILIARY MECHANISM

(71) Applicant: EVERWIN PNEUMATIC CORPORATION, Taichung City (TW)

(72) Inventor: Wei-En Chuang, Taichung City (TW)

(73) Assignee: EVERWIN PNEUMATIC CORPORATION, Taichung City (TW)

( * ) Notice: Subject to any disclaimer, the term of this patent is extended or adjusted under 35 U.S.C. 154(b) by 0 days.

(21) Appl. No.: 18/999,531

(22) Filed: Dec. 23, 2024

(51) Int. Cl.
*B25C 7/00* (2006.01)
*B25C 1/00* (2006.01)

(52) U.S. Cl.
CPC ................ *B25C 7/00* (2013.01); *B25C 1/008* (2013.01)

(58) Field of Classification Search
CPC .................................. B25C 7/00; B25C 1/008
See application file for complete search history.

(56) References Cited

U.S. PATENT DOCUMENTS 7,484,647 B2 * 2/2009 Yang ....................... B25C 1/008 227/129
9,993,913 B2 * 6/2018 McCardle ................. B25C 7/00
2015/0352701 A1 * 12/2015 Wu ......................... B25C 1/008 227/8
2017/0297188 A1 * 10/2017 Huang ...................... B25C 7/00
2019/0329390 A1 * 10/2019 Lin ......................... B25C 1/047
2020/0324398 A1 * 10/2020 Lamb .................... B25C 5/0292
2025/0058444 A1 * 2/2025 Huang .................... B25C 1/043

* cited by examiner

*Primary Examiner* — Thomas M Wittenschlaeger

(74) *Attorney, Agent, or Firm* — MUNCY, GEISSLER, OLDS & LOWE, P.C.

(57) ABSTRACT

A nail gun with an auxiliary mechanism includes a nail gun, a pressing member, and a connecting member. The nail gun has a firing module having an abutting member which moves reciprocatively. The pressing member has an extension section having a first linkage section and a stopping section. The pressing member is disposed on top of the nail gun. When the abutting member is imposed with a force to move, the stopping section abuts against the abutting member. The connecting member has a bending section having a second linkage section and a toggle piece. The second linkage section is connected with the first linkage section. The connecting member is arranged on one side of the nail gun. The user is allowed to press the toggle piece with one hand to turn off the safety and fires the nail gun with the other hand, increasing operation convenience and stability.

7 Claims, 6 Drawing Sheets

NAIL GUN WITH AN AUXILIARY MECHANISM

BACKGROUND OF THE DISCLOSURE

1. Field of the Disclosure

The present disclosure relates to auxiliary mechanisms, and more particularly, to a nail gun with an auxiliary mechanism facilitating the convenience of nail firing.

2. Description of the Related Art

The safety switch of conventional commercially available nail guns is generally positioned on the top of the gun body. When using, carpenters have to press the safety switch on the top of the gun body with one hand, and press the firing button with the other hand to fire a shot.

However, when carpenters place their hands on the top of the gun body during operation, the center of gravity of the nail gun will shift upward, causing an increase of the overall weight of the tool.

Also, during the nailing process, when carpenters need to move from one nailing position to the next one, they often have to lift the gun body, causing the operation to be more laborious. Especially problematic during a long and continuous period of nailing, such operation significantly increases the consumption of carpenters' energy.

SUMMARY OF THE DISCLOSURE

The present disclosure aims at resolving the issue of the conventional nail gun whose center of gravity being arranged upward with relatively laborious operation requirement. The safety switch of the conventional nail gun is arranged at the top of the gun body, requiring the user to press the safety switch with one hand and press the trigger button with the other hand. Such configuration causes the center of gravity of the nail gun to shift upward, with an increase of the overall weight. As a result, operation of the conventional nail gun is laborious, and users may experience fatigue after a long period of use.

For achieving the aforementioned objectives, an embodiment of the present disclosure provides a nail gun with an auxiliary mechanism, comprising:

a nail gun having a firing module, the firing module having an abutting member which moves reciprocatively;

a pressing member having an extension section, the extension section having a first linkage section and a stopping section disposed on two ends thereof, with angles respectively formed at the connections between the extension section, the first linkage section, and the stopping section, respectively, the pressing member disposed on a top part of the nail gun; when the abutting member is imposed with a force to move, the stopping section abuts against the abutting member without bearing a force; and a connecting member having a bending section, the bending section having a second linkage section and a toggle piece disposed on two ends thereof, the toggle piece arranged in perpendicular to a lateral side of the bending section, the second linkage section combined with the first linkage section, such that the connecting member is arranged on a lateral side of the nail gun.

With such configuration, the present disclosure optimizes the operation convenience and reduces the operation force requirement of the nail gun. With the safety mechanism disposed on the lateral side, the user effortlessly turns off the safety of the nail gun by simply push the toggle piece, so as to fire the nail without the need of placing one hand on the top of the nail gun for operating the safety switch. Therefore, the present disclosure effectively reduces the burden caused by the upward shift of the center of gravity, making it easier to lift and move the nail gun, reducing energy consumption during a long period of use, and also improving the stability and safety of operation.

DETAILED DESCRIPTION OF THE DISCLOSURE

Figure 1:
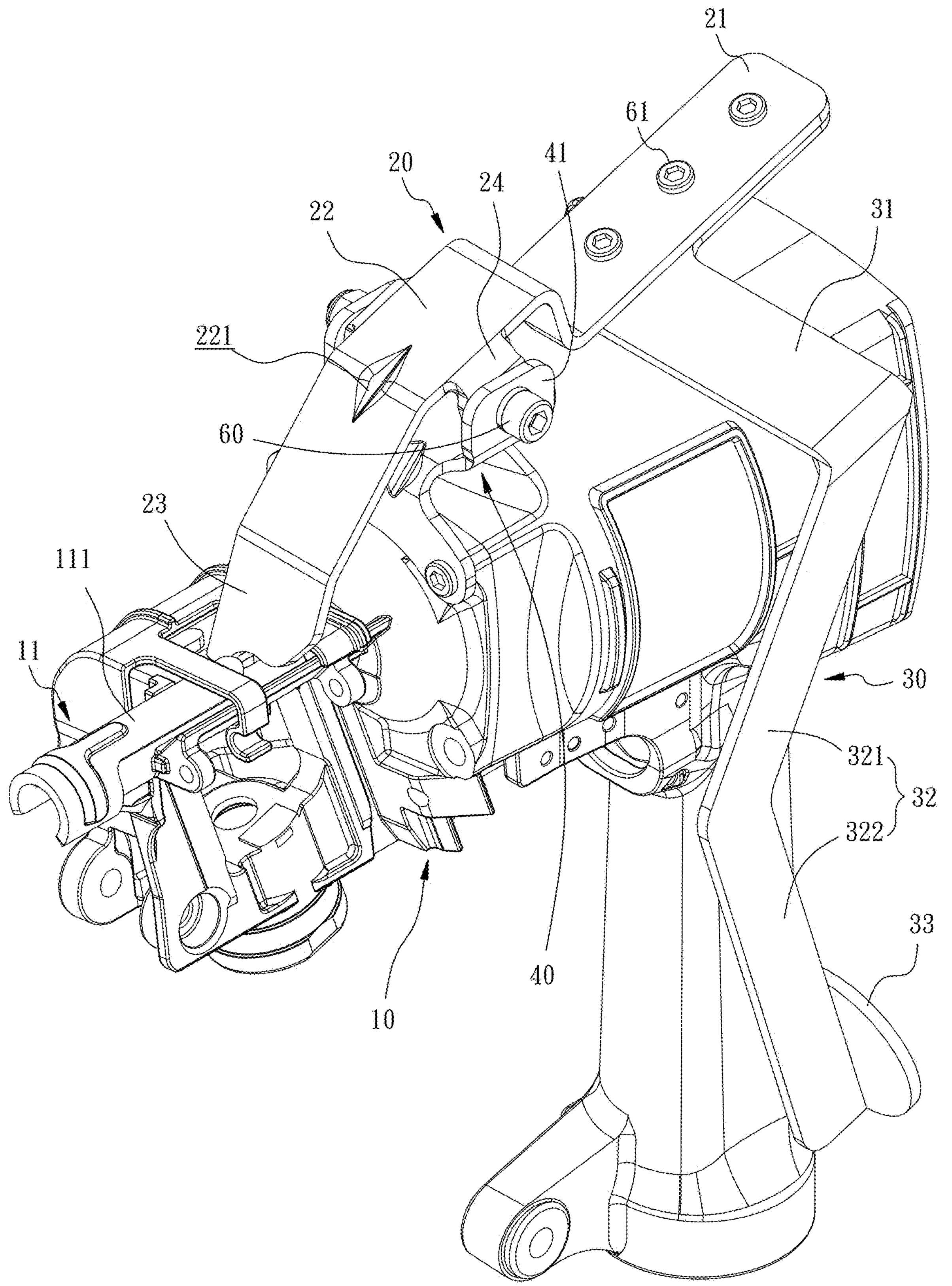
FIG. 1 is a perspective view of the nail gun with an auxiliary mechanism in accordance with an embodiment of the present disclosure.

The aforementioned and further advantages and features of the present disclosure will be understood by reference to the description of the preferred embodiment in conjunction with the accompanying drawings where the components are illustrated based on a proportion for explanation but not subject to the actual component proportion.

Referring to FIG. 1 to FIG. 6, the present disclosure provides a nail gun with an auxiliary mechanism, comprising a nail gun 10, a pressing member 20, and a connecting member 30. The nail gun 10 comprises a firing module 11. The firing module 11 comprises an abutting member 111 which reciprocatively moves. The pressing member 20 comprises an extension section 22. The extension section 22 has a first linkage section 21 and a stopping section 23 disposed on two ends thereof, respectively. Therein, an angle is respectively defined at the connection points between the extension section 22, the first linkage section 21, and the stopping section 23, respectively. The pressing member 20 is disposed on the top part of the nail gun 10. When the abutting member 111 is imposed with a force to displace, the stopping section 23 abuts against the abutting member 111 without bearing a force. The connecting member 30 comprises a bending section 32. The bending section 32 comprises a second linkage section 31 and a toggle piece 33. The toggle piece 33 is arranged in perpendicular to a lateral side of the connecting member 30. The second linkage section 31 is combined with the first linkage section 21, such that the connecting member 30 is arranged on a lateral side of the nail gun 10.

With such configuration, the connecting member 30 is allowed to be positioned on the left or the right side of the nail gun 10 based on the dominant hand of the user, so that the user holds the nail gun 10 with his/her dominant hand and push (press) the toggle piece 33 disposed on the lateral side of the nail gun 10 with the other hand. Meanwhile, the force applied to the toggle piece 33 drives the first linkage section 21 downward through the bending section 32 of the connecting member 30, causing the stopping section 23 to rise to leave the abutting member 111, turning off the safety for completing the firing operation. By pushing the toggle piece 33 on the lateral side of the nail gun 10, not only the safety of the nail gun 10 is effortlessly and easily turned off, but also upward shift of the center of gravity of the nail gun 10 is reduced, allowing the user to steadily hold the nail gun 10 using only one hand, achieving an easy operation and effectively lowering the energy consumption after a long period of use. The aforementioned second linkage section 31 and the first linkage section 21 are allowed to be combined in a detachable manner, such as through screwing, riveting, or clipping, or, alternatively, through integral formation methods like welding or hot-melting.

Figure 2:
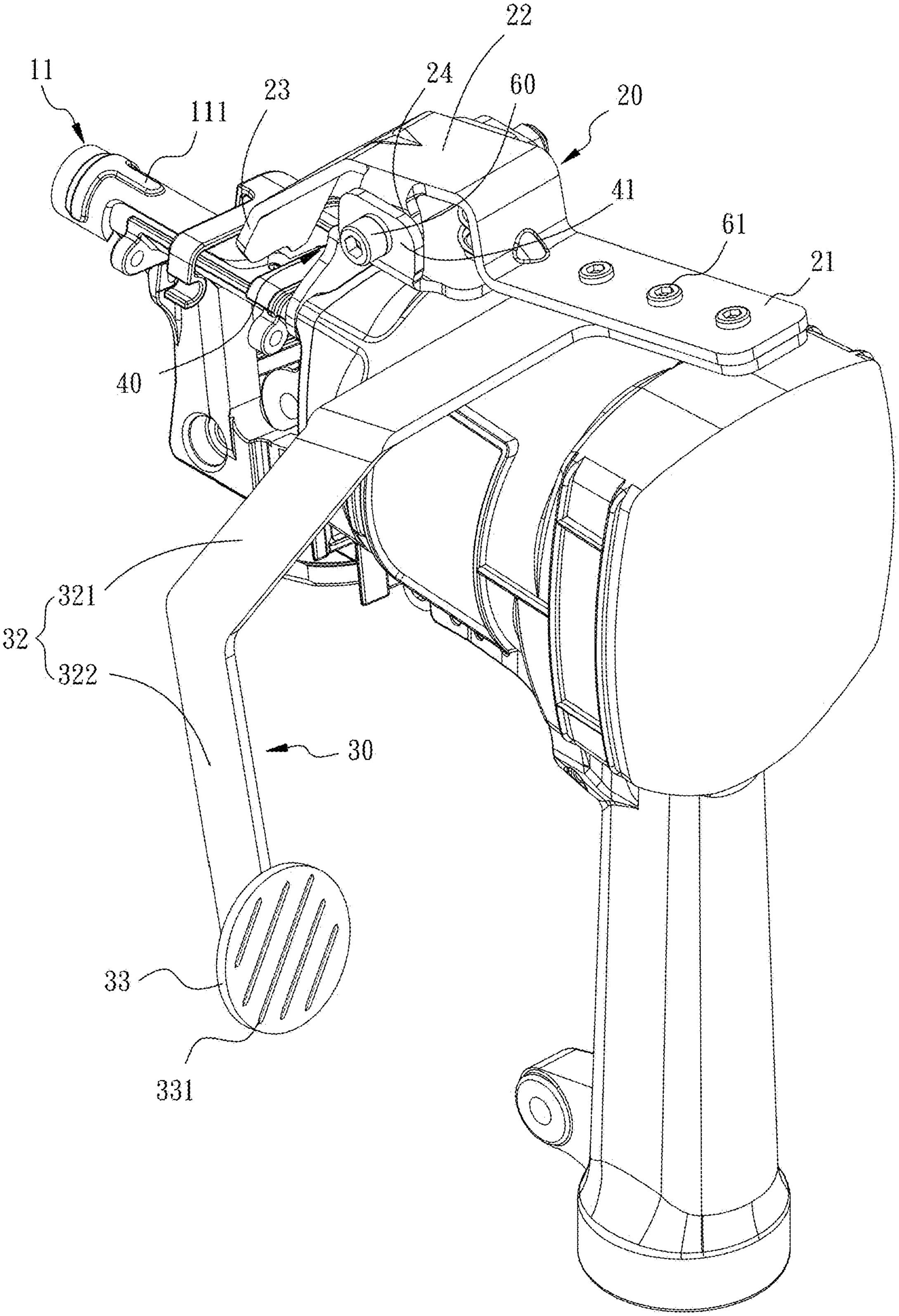
FIG. 2 is a perspective view of the nail gun with an auxiliary mechanism in accordance with an embodiment of the present disclosure taken from another point of view.

Referring to FIG. 2 in view of FIG. 1, in another embodiment, the toggle piece 33 has an anti-slip structure 331 disposed on the surface thereof for increasing the friction thereon, such that the toggle piece 33 is more steadily pushed and pressed, preventing slip and improving the operation stability, thereby reducing operation accidents.

Figure 3:
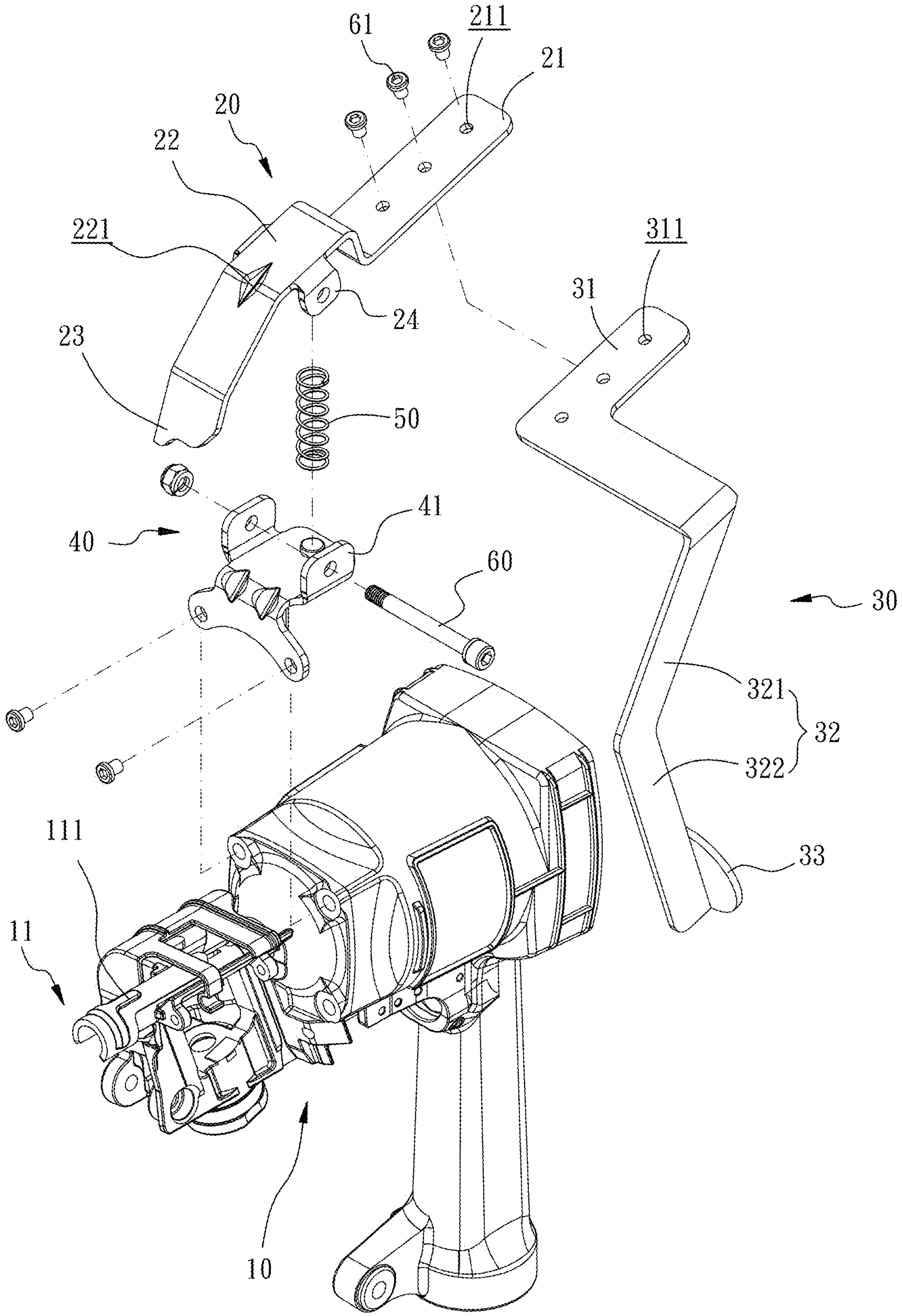
FIG. 3 is an exploded view of the nail gun with an auxiliary mechanism in accordance with an embodiment of the present disclosure.

Referring to FIG. 1 to FIG. 3, in another embodiment, the bending section 32 comprises a first plate 321 and a second plate 322 that are integrally formed, with a bending angle included between the first plate 321 and the second plate 322. The integrally formed bending section 32 not only reduces the number of components and assembly difficulty, but also enhances the structural durability.

Referring to FIG. 1 to FIG. 3, in another embodiment, the second linkage section 31 is formed in an L-shaped structure, with a part of the second linkage section 31 connected with the first plate 321. The second linkage section 31 is formed in an L-shaped structure, so that when the second linkage section 31 is combined with the first linkage section 21, the horizontal extension of the second linkage section 31 makes the connecting member 30 be arranged on the lateral side of the nail gun 10. Although, in the embodiment, the second linkage section 31 is a horizontal L-shaped structure, the second linkage section 31 is not limited to the form here. The second linkage section 31 may also have a bending or angled structure, as long as the second linkage section 31 extends the connecting member 30 to the lateral side of the nail gun 10.

Referring to FIG. 1 to FIG. 3, in another embodiment, the first plate 321 is inclined toward the nail gun 10, and the second plate 322 is inclined away from the nail gun 10. The toggle piece 33 is combined to one end of the second plate 322 away from the first plate 321.

Referring to FIG. 1 to FIG. 3, in another embodiment, the toggle piece 33 extends toward one side away from the nail gun 10. The toggle piece 33 extends toward a lateral side away from the nail gun 10 and maintains an appropriate distance from the nail gun 10. When the user pushes the toggle piece 33 with one hand, the user keeps a comfortable distance from the other hand, not only preventing a crowded feeling, but also facilitating the force imposing operation of the hand, enhancing operational stability and comfort.

Referring to FIG. 1 to FIG. 3, in another embodiment, the present disclosure further comprises an assembly seat 40 fixed to the top part of the nail gun 10, with an elastic member 50 disposed on the top part of the assembly seat 40. The pressing member 20 presses the elastic member 50 and is fixed to the assembly seat 40. The elastic member 50 disposed on the top part of the assembly seat 40 allows the pressing member 20 to automatically return to the original position after being imposed with a force to displace, so as to lower the burden of the hand during operation.

Referring to FIG. 1 to FIG. 3, in another embodiment, the assembly seat 40 has a side extension part 41 extending from two sides of the assembly seat 40, respectively. The pressing member 20 has a side lock part 24 disposed on corresponding positions on two sides of the pressing member 20, respectively. Each side lock part 24 and the corresponding side extension part 41 are overlapped and fixed through a fastener 60, so as to improve the assembly strength and structural stability, thereby preventing components from loosening during the usage and simplifying the assembly, disassembly, and maintenance process.

Referring to FIG. 1 to FIG. 3, in another embodiment, the first linkage section 21 comprises a plurality of first positioning bores 211 passing therethrough, and the second linkage section 31 comprises a plurality of corresponding second positioning bores 311 passing therethrough, with a positioning member 61 passing through the corresponding first positioning bores 211 and second positioning bores 311, respectively, thereby further stabilizing the overall structure.

Referring to FIG. 1 to FIG. 3, in another embodiment, the extension section 22 comprises at least an allowance hole 221 passing therethrough, thereby not only reducing the weight of the pressing member 20, but also facilitating heat dissipation and air exhaustion.

Figure 4:
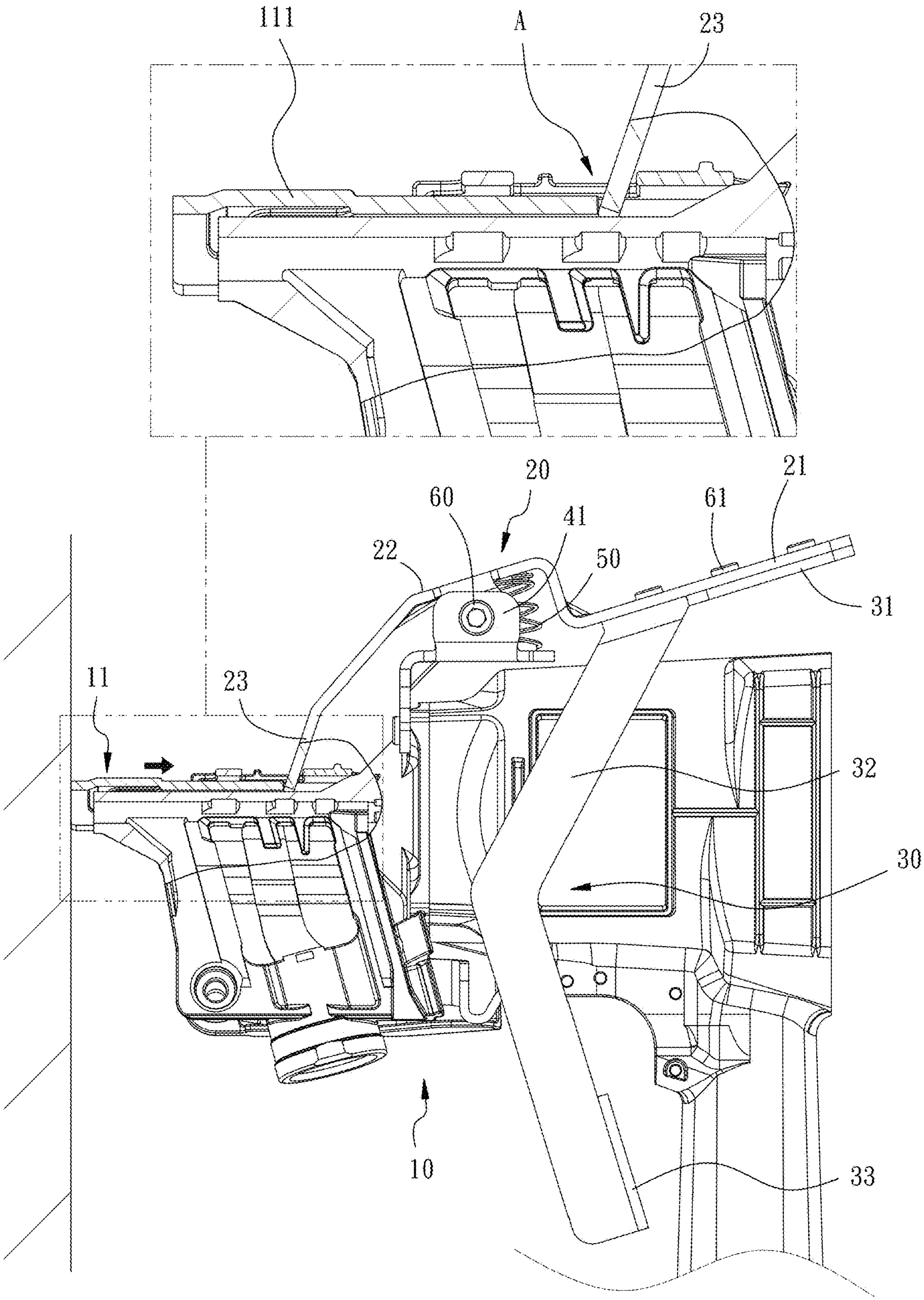
FIG. 4 is a schematic view of the nail gun with an auxiliary mechanism with the firing module at the safe position.

Referring to FIG. 4, when the nail gun 10 is pressed against a wall and pushes the abutting member 111, if the user is not imposing a force on the toggle piece 33, the abutting member 111 moves to a predetermined distance and then abuts against the stopping section 23. Meanwhile, the stopping section 23 is at a safe position A, and the safety mechanism is not turned off.

Figure 5:
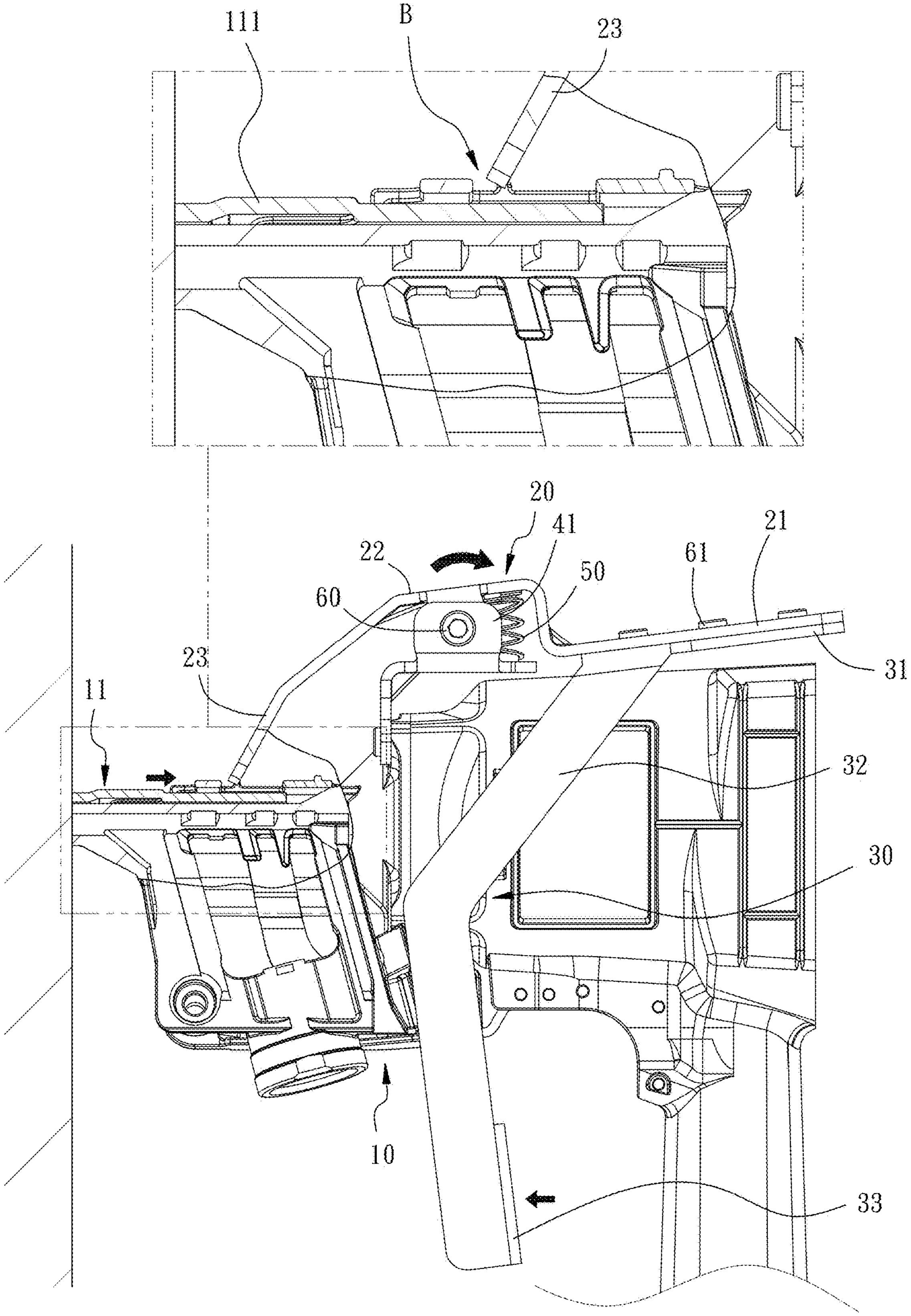
FIG. 5 is a schematic view of the nail gun with an auxiliary mechanism with the firing module at the firing position.
Figure 6:
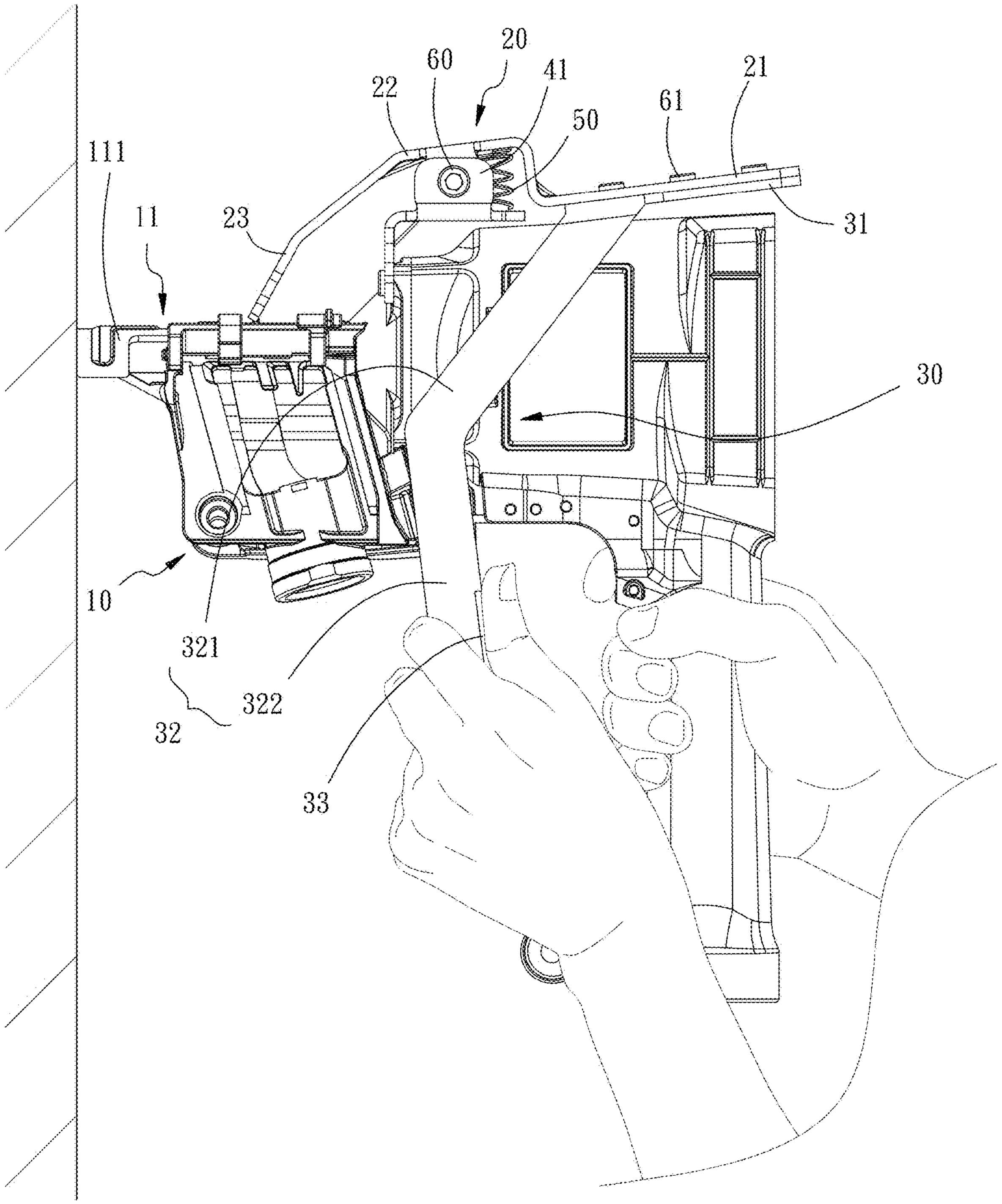
FIG. 6 is a schematic view illustrating the operation of the nail gun with an auxiliary mechanism.

Referring to FIG. 5 and FIG. 6, when the user uses one hand to impose a force for pushing the toggle piece 33 on the lateral side of the nail gun 10 forward, forcing the toggle piece 33 to move toward the muzzle of the nail gun 10, the connecting member 30 is simultaneously imposed with the force to drive the first linkage section 21 of the pressing member 20 to move downward. At this point, the stopping section 23 shifts upward due to the leverage, so that the abutting member 111 smoothly moves to a firing position B, with the safety mechanism turned off, allowing the user to carry out the nail firing operation of the nail gun 10.

With the foregoing configuration, the present disclosure achieves following advantages.

The present disclosure achieves the operation convenience and reduces the operation force requirement. With the toggle piece 33 disposed on the lateral side of the nail gun 10, the user is allowed to push the toggle piece 33 by use of only one hand to easily turn off the safety of the nail gun 10. Such design does not increase the overall weight of the nail gun 10 or cause its center of gravity to shift upward, thereby reducing the operational burden, preventing excessive energy consumption after a long period of use, and facilitating the smooth operation.

The present disclosure achieves the structural stability. The L-shaped bending section 32 improves the overall stability and structure strength. The integrally formed design of it not only reduces the number of components and assembly difficulty, but also enhances the structural durability.

The present disclosure achieves an effortless force application. The toggle piece 33 extends toward the lateral side in opposite to the nail gun 10 and maintains an appropriate distance, meeting the ergonomics, thereby preventing a crowded feeling when the user pushes the toggle piece 33, and enhancing the stability of force imposing operation of hand.

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:

1. A nail gun with an auxiliary mechanism, comprising:

a nail gun having a firing module, the firing module having an abutting member which moves reciprocatively;

a pressing member having an extension section, the extension section having a first linkage section and a stopping section disposed on two ends thereof, with angles respectively formed at the connections between the extension section, the first linkage section, and the stopping section, respectively, the pressing member disposed on a top part of the nail gun; when the abutting member is imposed with a force to move, the stopping section abuts against the abutting member without bearing a force; and a connecting member having a bending section, the bending section having a second linkage section and a toggle piece disposed on two ends thereof, the toggle piece arranged in perpendicular to a lateral side of the bending section, the second linkage section combined with the first linkage section, such that the connecting member is arranged on a lateral side of the nail gun;

wherein the bending section comprises a first plate and a second plate that are integrally formed, with a bending angle included between the first plate and the second plate;

wherein the second linkage section is formed in an L-shaped structure; the second linkage section is partially connected with the first plate;

wherein the first plate is inclined toward the nail gun, and the second plate is inclined away from the nail gun, with the toggle piece combined to one end of the second plate away from the end of the second plate combined to the first plate.

2. The nail gun with an auxiliary mechanism of claim 1, wherein the toggle piece extends toward one side away from the nail gun.

3. The nail gun with an auxiliary mechanism of claim 2, wherein the toggle piece has an anti-slip structure disposed on a surface of the toggle piece.

4. The nail gun with an auxiliary mechanism of claim 3, wherein the second linkage section and the first linkage section are combined in an integrally formed manner.

5. The nail gun with an auxiliary mechanism of claim 1, wherein an assembly seat is fixed to the top part of the nail gun; the assembly seat has an elastic member disposed on a top part thereof; the pressing member presses the elastic member and is fixed to the assembly seat; the assembly seat has a side extension part extending from two sides of the assembly seat, respectively; the pressing member has a side lock part disposed on corresponding positions on two sides of the pressing member, respectively; each of the side lock parts and the corresponding side extension part are overlapped and fixed through a fastener.

6. The nail gun with an auxiliary mechanism of claim 1, wherein the first linkage section comprises a plurality of first positioning bores passing therethrough, and the second linkage section comprises a plurality of corresponding second positioning bores passing therethrough, with a positioning member passing through the corresponding first positioning bores and second positioning bores, respectively.

7. The nail gun with an auxiliary mechanism of claim 1, wherein the extension section comprises at least an allowance hole passing therethrough.

* * * * *